United States Patent [19]

Murakami et al.

[11] Patent Number: 4,926,408
[45] Date of Patent: May 15, 1990

[54] MAGNETO-OPTIC RECORDING/ERASING SYSTEM WITH SIMULTANEOUS DUAL HEAD CONTROL AND DISK ERROR DETECTION

[75] Inventors: Teruo Murakami, Yokohama; Naobumi Seo, Tokyo, both of Japan

[73] Assignee: Kabushiki Kaisha Toshiba, Kawasaki, Japan

[21] Appl. No.: 338,168

[22] Filed: Apr. 14, 1989

Related U.S. Application Data

[62] Division of Ser. No. 871,558, Jun. 6, 1986, Pat. No. 4,841,502.

[30] Foreign Application Priority Data

| Jun. 14, 1985 | [JP] | Japan | 60-128265 |
| Sep. 17, 1985 | [JP] | Japan | 60-203325 |
| Oct. 7, 1985 | [JP] | Japan | 60-221771 |

[51] Int. Cl.$^5$ .............................................. G11B 7/00
[52] U.S. Cl. ..................................... 369/58; 360/114; 369/13
[58] Field of Search ...................... 369/13, 54, 58, 47; 360/114, 72.1, 72.2; 365/122

[56] References Cited

U.S. PATENT DOCUMENTS 4,712,203 12/1987 Saito et al. ........................... 369/13

Primary Examiner—Robert L. Richardson
Attorney, Agent, or Firm—Foley & Lardner, Schwartz, Jeffery, Schwaab, Mack, Blumenthal & Evans

[57] ABSTRACT

A magneto-optic recording/erasing system uses two heads, one for writing formatted information into sectors along a track of a magneto-optical disk and a second head working simultaneously with the first head to read formatted information and detect defects. The system also writes information during formatting to indicate damaged disk track sectors and eliminate reference to them during formatting to produce a more reliable disk.

5 Claims, 10 Drawing Sheets

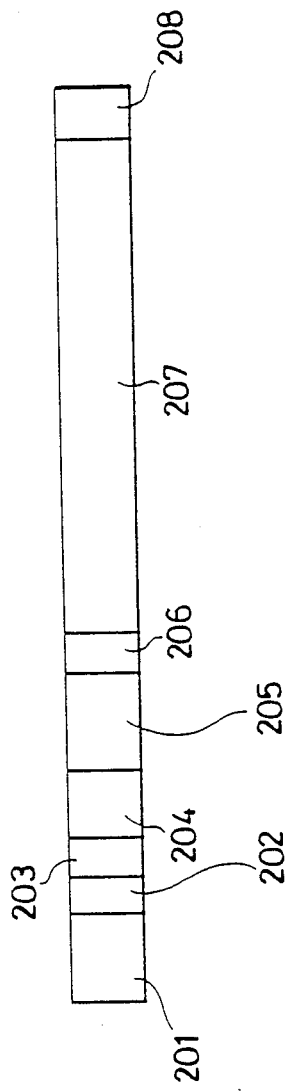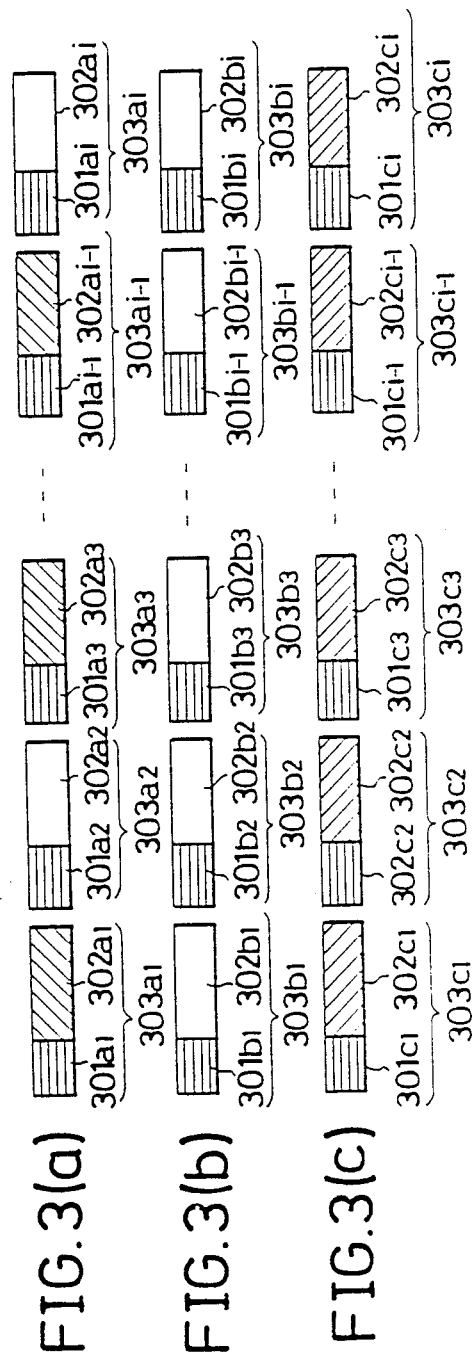

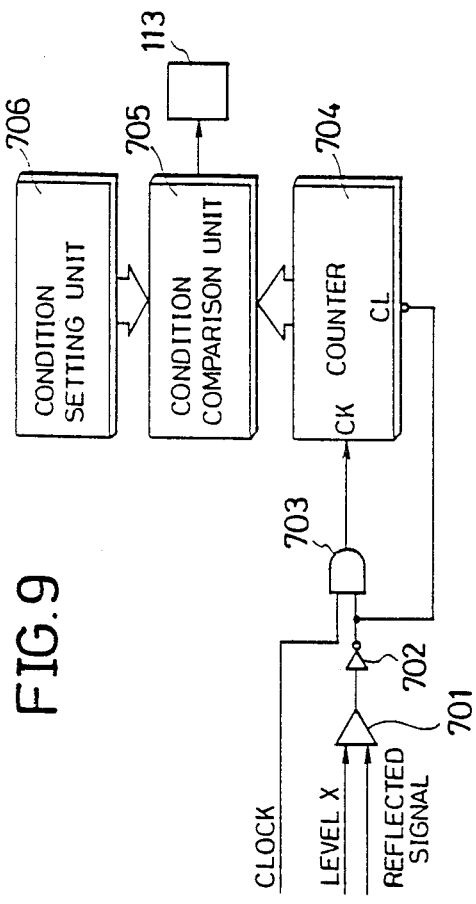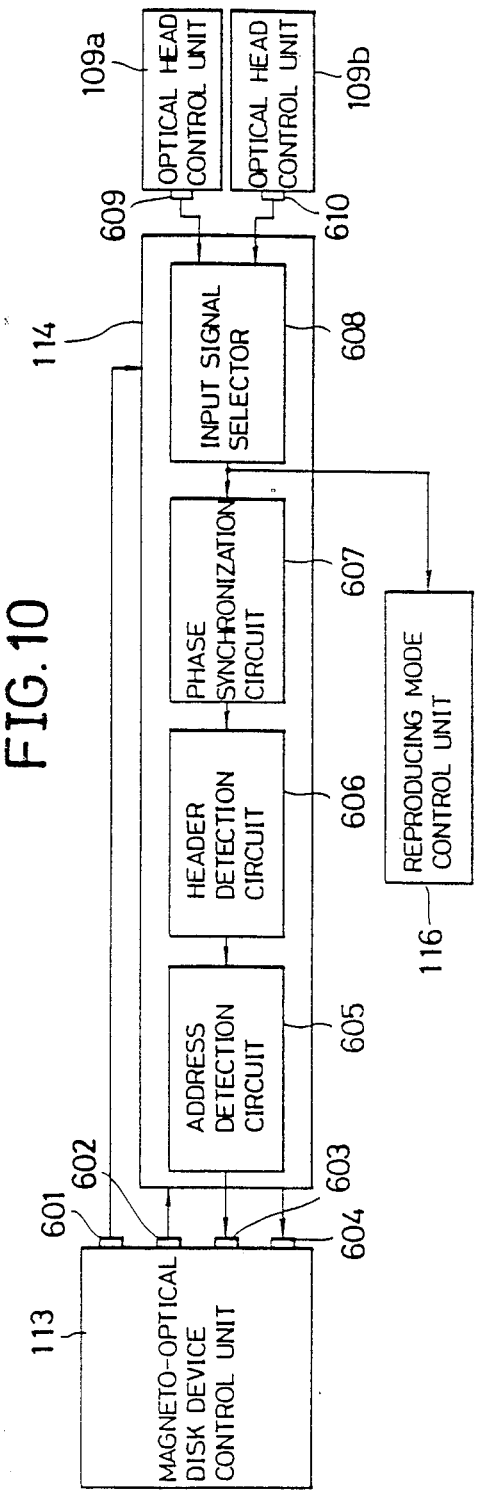

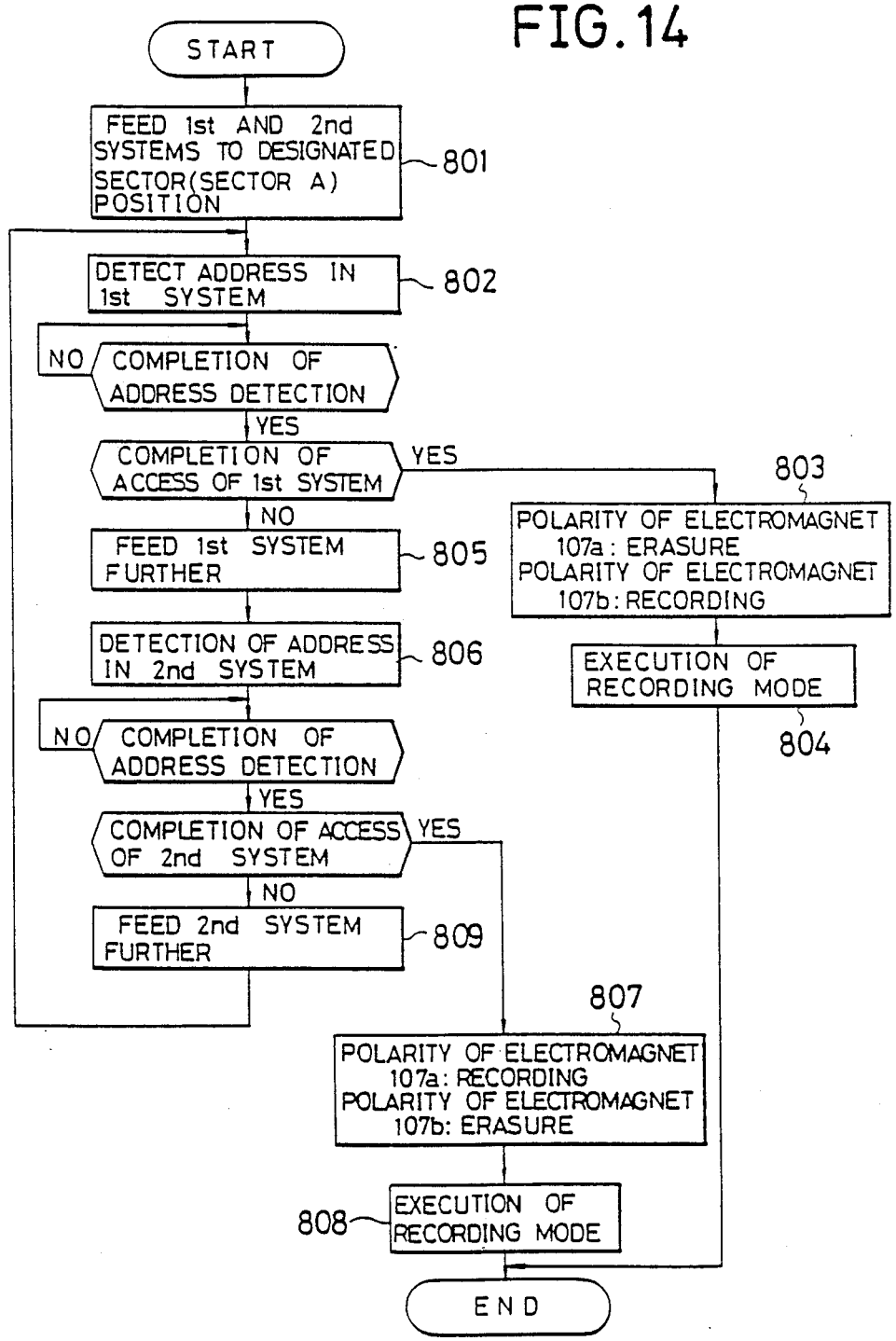

MAGNETO-OPTIC RECORDING/ERASING SYSTEM WITH SIMULTANEOUS DUAL HEAD CONTROL AND DISK ERROR DETECTION

This application is a division, of application Ser. No. 06/871,558, filed June 6, 1986 now U.S. Pat. No. 4,841,502.

BACKGROUND OF THE INVENTION

1. Field of the Invention

The present invention relates to an information recording system.

2. Description of the Prior Art

Along with the increase in the capacity and the operation speed of the electronic computer in recent years, high density and large capacity for the memory devices are being demanded to an increasingly high degree. Examples of memory devices include an optical disk file device which records and reproduces information as a bit sequence that can be read optically, a magnetic recording device which carries out recording of information on a recording medium with magnetic layers by inverting and an erasable magneto-optical disk device which records and erases information by means of irradiation of laser light and application of a magnetic field, and reproduces information by irradiation of laser light. Among various memory device, one which is attracting the most attention is the information recording and reproducing device that makes use of an optical disk. The optical disk device records information by irradiating an optical disk with a laser beam that is squeezed to a spot with diameter of about 1 m to form a bit that has a width of 0.6 to 1 m and a length of 1 to 2 m. The optical disk device reproduce recorded information by detecting the changes in the reflected or transmitted light from the bits recorded on the optical disk.

Examples of optical disk recording media include a recording medium of direct read after write (DRAW) type for which it is impossible to erase and re-record information, and a recording medium of erasable type for which it is possible to re-record (erase or record) information for a plurality of times. The information recording and reproducing DRAW type device has an advantage of impossibility of rewriting information. However, from the viewpoint of economy and effectiveness the erasable type is more superior.

A recording medium of erasable type has an amorphous alloy film that is composed of rare earth elements such as Gd, Td, Dy, and Ho and transition metals such as Fe and Co, as the recording film. From the magnetically ordered condition maintained at the room temperature, with the easy axis of magnetization in the direction perpendicular to the magneto-optical film, a magnetically disordered state can be obtained by irradiating the recording film (perpendicularly magnetized film) with a laser beam or the like.

The magnetically ordered and disordered states here mean the conditions in which the coercive force of the easy axis of magnetization is securely held and decreased, respectively. If an external magnetic field with a predetermined direction is applied to the recording film when it is in a magnetically disordered state, the easy axis of magnetization of the recording film rotates toward the direction of magnetic field applied. In this way, it becomes possible to carry out recording or erasing.

Now, the method of recording information on the recording film that has all of its magnetic domains arranged in the same direction (for example, in the downward direction) in a state where is no information is recorded, will be described in detail.

A laser beam which modulates information, is focused to a size with diameter of about 1 m, and is made to irradiate the recording film to heat it locally with the energy of the laser beam to reduce the coercive force of that portion of the film. In this case, by applying an external magnetic field (usually, less than 1 kOe) with the direction which is opposite to the initial direction (downward direction), of magnetization the local direction of magnetization alone will be reversed. The portion of the recording film other than the portion that is irradiated by the laser beam will not undergo a change in the initial direction of magnetization (inversion) even under the application of an external magnetic field. Therefore, there will be formed a pattern that has different direction (upward direction) of magnetization within a uniform field of magnetization. That is, it corresponds to a recording of information.

Next, a method of erasing previously recorded information by means of a principle which is nearly the same as in the above will be described. Namely, one needs only to select the direction of magnetic field to be opposite to the direction of the magnetic field that was applied at the time of recording information. For instance, by irradiating the recorded portion of the recording film with a laser beam and by applying an external magnetic field with direction which is opposite to that at the time of recording, the direction of magnetization returns to the state which is the same as prior to the recording, erasing information previously recorded.

Further, for reproducing information, differing from the case of recording and erasing, use will be made of the rotation of the plane of polarization of the laser beam. On the recording film (perpendicularly magnetized film) of the recording medium, there are disposed magnetic domains perpendicularly. When the film is irradiated by a laser beam, the direction of polarization of the reflected (or transmitted) light rotates according to the direction of magnetic domain. In other words, if a linearly polarized laser beam irradiates the surface of the film, the plane of polarization of the reflected light rotates slightly depending upon the direction of magnetization of the film. The rotation of the plane of polarization is detected by means of a light detector and the signal due to the direction of magnetization of the film is converted to the intensity (1 or 0) of the reflected light, reproducing the information.

In the above, recording, reproducing, and erasing of information are performed by making use of the sence of magnetization of each magnetic domain.

As a memory with the recording film having the above features, the erasable medium is called a magneto-optical disc. Although this magneto-optical disc is erasable, it is inappropriate to carry out writing operations directly on the area which has already undergone the previous writing operations, since the domain inversed by the previous operations is left as it was. Because of this, erasing operations where writing is to made is necessary in advance before new information can be written on the area. Of cource where only one head is available, it takes double the time to complete re-recording.

One method for rewriting of information, for example, is a magneto-optical device for recording, reproducing, and erasing disclosed in Japanese Patent No. 59-217250. This device has an optical system for recording that records of a desired information, and another optical system that erases unnecessary information or reproduces information that was written by means of the recording optical system. With such an arrangement, it becomes possible to partially erase unnecessary information alone, and at the same time, to record new information.

However, in attempting to apply such a concept to a practical device, there still remains certain unsolved technical problems. For example, 1. Provision of two heads requires large sized hardware and sophisticated control systems. 2. It can perform only signal reproduction that is entirely identical to the case of an ordinary single head optical system. 3. Sufficient response is not available for information that comes transported successively (continuously flowing information). 4. The waiting time for rotation, in accessing the optical system to the position where rewriting is desired, is too long. 5. Finally, the size of the recording bits for such a device is extremely small, being on the order of one micrometer. Accordingly, even dust, scratches, pinholes, and other small size objects could become the cause of the faulty signals in recording or reproducing, which results in larger error rates compared with the case of magnetic disks. Thus, the magneto-optical disk device is not put to practical use unless these technical problems are resolved.

SUMMARY OF THE INVENTION

An object of the present invention is to provide an information recording system which is capable of making practical application of an optical system with two heads.

Another object of the invention is to provide an information recording system which is capable of carrying out rewriting of information at a high speed.

Further object of the invention is to effectively control an optical system having two heads.

Further object of the invention is to provide an information recording system which makes it easy to control sectors in the recording medium.

Further object of the invention is to provide an information recording system which makes it easy to control errors on the recording medium.

Further object of the invention is to provide an information recording system which is capable of performing the sector access of the head with smaller loss in time.

Further object of the invention is to provide an information recording system which is capable of operating with high reliability

BRIEF DESCRIPTION OF THE DRAWINGS

FIG. 2 is a schematic block diagram for the sector,

FIGS. 3(a) through 3(c) are diagram 5 for illustrating the recorded state of the sector on the recording medium in re-recording process.

FIG. 9 is a block diagram for illustrating an embodiment of the fault detection circuit, FIG. 10 is a schematic block diagram for a sector address detection, FIG. 14 is a flow chart for another embodiment of the invention.

PREFERRED EMBODIMENTS OF THE INVENTION

Figure 1:
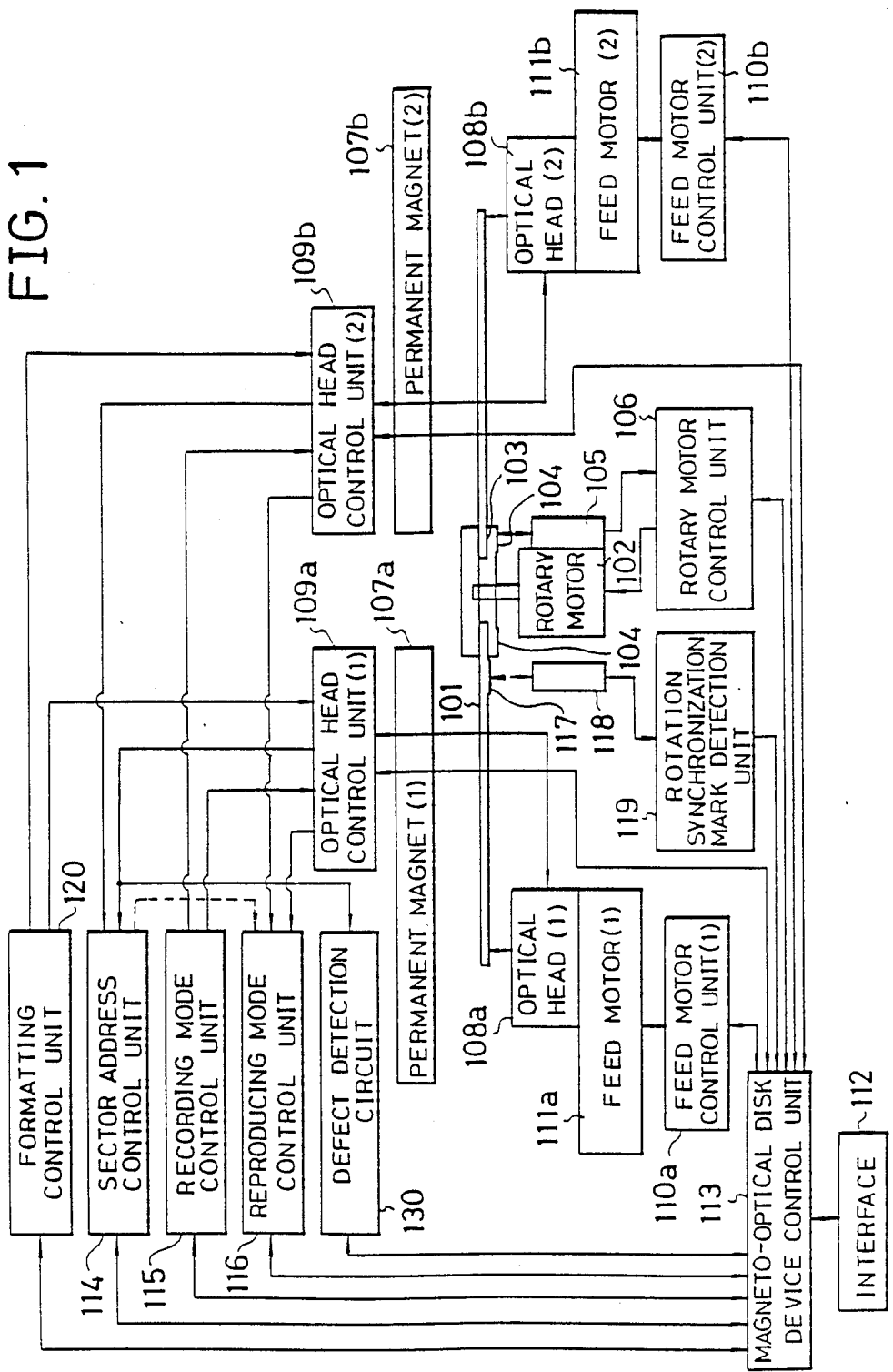
FIG. 1 is a schematic block diagram for a device embodying the invention.
Figure 4:
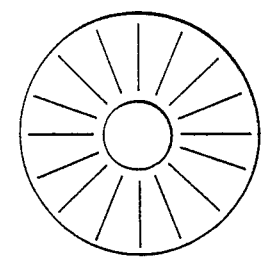
FIG. 4 is a view of the pattern on the turn table.

FIG. 1 is a schematic block diagram for an optical information recording and reproducing device which is an embodiment of the invention that uses a magneto-optical disk as the recording medium A magneto-optical disk 101 is mounted on a turn table 103 that is placed above a rotary motor 102. At the position designated as 104 on the turn table 103, there are provided rotation control patterns that are patterned radially with a predetermined separation, as shown in FIG. 4. The rotation control patterns 104 are provided so as to rotate the magneto-optical disk 101 that is attached to the turn table 103 at a predetermined speed. The rotation of the turn table is detected by an optical detector for rotation control 105. The detected signal is input to the rotary motor control unit 106 where the drive and rotation of the rotary motor 102 is controlled to give it a predetermined speed of rotation.

Reference numerals 107a and 107b are magnetic field generating elements that consists of permanent magnets (1) 107a and (2) 107b with mutually reversed polarities. These magnets have a sufficient length, and also a uniform and sufficiently high intensity magnetic field in the radial direction of the magneto-optical disk 101, in order to provide a magnetic field that is required for recording and erasing the entire recording region of the magneto-optical disk at least.

Reference numerals 108a and 108b are optical heads (1) 108a and (2) 108b, respectively, each consisting of a laser, photo-detectors, optical element, and so forth. They irradiate the magneto-optical disk 101 with laser beams, and detect control signals for tracking and focusing and the signals for information reproduction. These optical heads are controlled by the optical head control units (1) 109a and (2) 109b. The optical head (1) 108a and the optical head (2) 108b are supported by the feed motor (1) 111a and the feed motor (2) 111b that are connected to the feed motor control unit (1) 110a and the feed motor control unit (2) 110b, respectively Each of these optical heads can be moved to an arbitrary radial position on the magneto-optical disk 101. Moreover, the permanent magnet (1) 107a, the optical head (1) 108a, and the feed motor (1) 111a form a first system, and the permanent magnet (2) 107b, the optical head (2) 108b, and the feed motor (2) 111b form a second system.

The optical information recording and reproducing device of the present embodiment possesses a recording mode, a reproducing mode, and a formating mode. In executing recording/reproducing mode, recording/reproducing mode indication signal, recording/reproducing sector address, recording/reproducing information bit number, information signal, and other signals are transferred from an external system that is not shown to a magneto-optical disk device control unit 113 via an interface 112. Then, the sector indicated by a sector address control unit 114 is accessed, and each of the above modes is executed for a sector unit that consists of a fixed number of information bits by a recording mode control unit 115 and a reproducing mode control unit 116.

Further, in the magneto-optical disk 101, there is formed beforehand a rotation synchronization mark 117 for generating rotation synchionization signals at the rate of one pulse per rotation. The rotation synchronization mark 117 is detected by an optical detector for the rotation synchronization mark 118 and a rotation synchronization mark detection unit 119. With the position of formation of the rotation synchronization mark 117 as the reference, a sector control signal that includes the sector address under consideration, is formated in a formating control unit 120 according to a fixed format. The form of the rotation synchronization mark 117 will be made clear in the latter half of this document Referring to FIG. 2, the formating will be described next.

FIG. 2 illustrates a simplified composition of a sector which is the unit in recording or reproducing information. A sector consists of a synchronized signal (1) 201 for reproducing the address of the sector, a header (1) 202 for indicating the starting position of the sector address, a sector address 203, a gap (1) 204, a synchronized signal (2) 205 for reproducing the recorded information, a header (2) 206 for indicating the starting position of the recorded information, an information signal 207 that consists of a fixed number of information bits, and a gap (2) 208. Here, the synchronized signal (1) 201, the header (1) 202, and the sector address 203 form a sector control signal which is formated according to the specifications of the system, preceding recording of the information in the magneto-optical disk 101 as mentioned above.

Referring to FIG. 3, a detailed description will be given about the operation of executing the recording of information that is transferred from an external system, according to the recording mode of the present invention.

When a recording mode indication signal, and information on the recording information bits, and the sector to be recorded are transferred from an external system, the magneto-optical disk device control unit 113 reproduces and detects the sector address by the sector address control unit 114, and lets the optical head (1) 108a and the optical head (2) 108b access the track on which is located the indicated sector by the action of the feed motor control unit (1) 110a and the feed motor control unit (2) 110b. Then, at the optical head (1) 108a of the first system that includes the permanent magnet (1) 107a that is given a polarity determined, in accordance with the recording mode control unit 115, so as to produce a magnetic field with the direction for erasure, the direction of the magnetic domain is arranged uniformly in a fixed direction by means of the erasure operation in which the information bit recording regions are irradiated continuously in succession, regardless of the presence or absence of information, with a laser light of a predetermined intensity.

FIG. 3($a$) is a diagram for illustrating the state of the magneto-optical disk 101 that is indicated by the external system, prior to the execution of the recording mode. Namely, assume that the information bit number that is transferred from the external system indicates recording to a number i of sectors that correspond to the sectors $303a_1$ to $303a_i$.

The regions $301a_1$ to $301a_i$ those where information concerning the sector addresses for the sectors $303a_1$ to $303a_i$ is formated. Each of them consists of a synchronized signal (1) 201, a header (1) 202, and a sector address 203 as shown in FIG. 2, where the sector address increases from $301a_1$ to $301a_i$. Moreover, $302a_1$ to $302a_i$ are the regions for recording the informations signals, and each of them consists of a gap (1) 204, a synchronized signal (2) 205, a header (2) 206, an information signal 207, and a gap (2) 208 as shown in FIG. 2. Furthermore, the hatched regions $302a_1$, $302a_3$, . . . , and $302a_{i-1}$ are those where some kinds of information have already been recorded, whereas no information is recorded in the blank regions of $302a_2$, . . . , and $302a_i$.

FIG. 3($b$) is a diagram for illustrating the state of the indicated sectors after the erasing operation is performed in which the regions $301b_1$ to $301b_i$ and the regions $301a_1$ to $301a_i$, $302b_1$ to $302b_i$ and $302a_1$ to $302a_i$, and $303b_1$ to $303b_i$ and $303a_1$ to $303a_i$ signify respectively identical regions. In other words, the hatched regions of FIG. 3($a$) are in the state in which the magnetic domains of the regions for recording information are, as a result of the erasure operation, arranged uniformly in a fixed direction which is specified by the system.

Next, the sector whose information is erased by the optical head (1) 108a of the first system is rotated by the rotary motor 102 and is brought to the position of the optical head (2) 108b of the second system that includes the permanent magnet (2) 107b that has a polarity which is determined to generate a magnetic field in the direction for recording information. Then, the information that is transferred from the external system is recorded in turn in the regions whose magnetic domains are in a fixed direction by the erasure operation, in accordance with the recording mode control unit 115 by turning on/off the laser light from the optical head (2) 108b. FIG. 3($c$) is a diagram that illustrates the state of the regions of the indicated sectors after the operation of recording information. Here, the regions $301c_1$ to $301c_i$ and the regions $301b_1$ to $301b_i$, $302c_1$ to $302c_i$ and $302b_1$ to $302b_i$, and $303c_1$ to $303c_i$ and $303b_1$ to $303b_i$ indicate respectively identical regions, and information bits or the like are recorded anew in the regions $302c_1$ to $302c_i$.

More specifically, the region that is erased by the erasure operation is the continuous region that consists of a portion that includes the rear end of the gap (2) 204, the synchronized signal (2) 205, the header (2) 206, the information signal 207, a portion that includes the front end of the gap (2) 208, but recording is made anew in the synchronized signal (2) 205, the header (2) 206, and the information signal 207 in the erased region. Namely, a region which is sufficiently wider than the region required for new recording is erased first.

Figure 5:
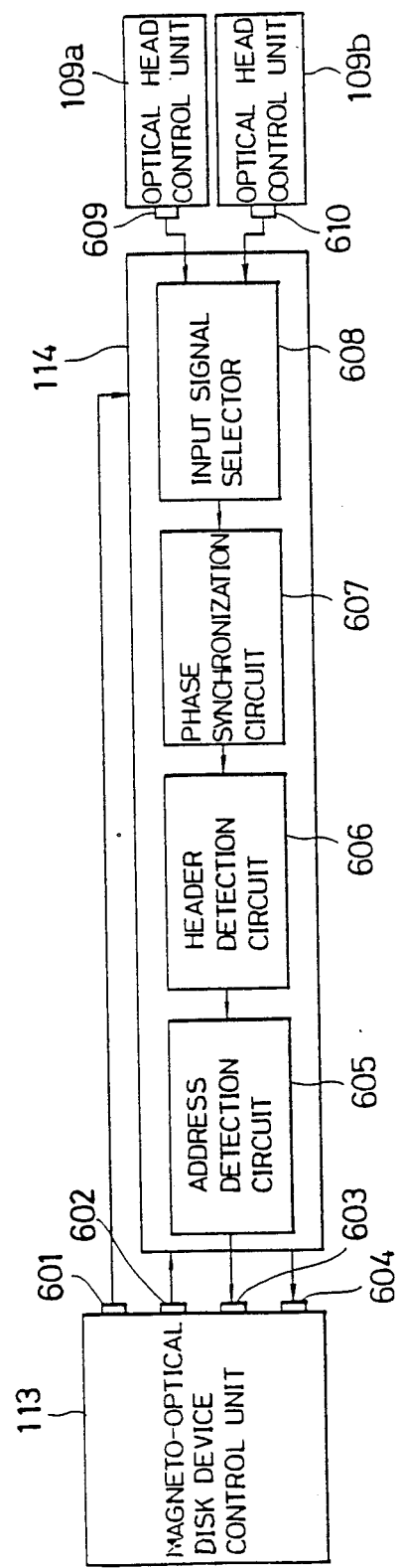
FIG. 5 is a block diagram for illustrating an embodiment of the sector address control unit.

FIG. 5 is a diagram for illustrating the operation of the sector address control unit 114 in detail. In the present embodiment a first reproduced signal from the optical head reproducing signal output terminal 609 due to the optical head control unit (1) 109a and a second reproduced signal from the optical head reproducing signal output terminal 610 due to the optical head control unit (2) 109*b*, of the signal that is recorded on the magneto-optical disk 101, are input to the input signal selector 608 of the sector address control unit 114. Then, one of the two reproduced signals is selected there in accordance with the signal from the optical head switching signal output terminal 601 of the magneto-optical disk device control unit 113, and the sector address is reproduced and detected. Namely, when the signal from a sector address detection command output element 602 of the magneto-optical disk device control unit 113 is input to the sector address control unit 114, the signal to a sector address detection status input terminal 604 becomes BUSY, and is selected by the input signal selector 608 that is indicated by the signal from the optical head switching signal output terminal 601. Then, the selected reproduced signal is led to a phase synchronization circuit 607, the starting position of the sector address signal is detected by a header detection circuit 606, and the sector address is reproduced and detected in an address detection circuit 605. After reproducing and detecting the sector address, the signal to the sector address detection status input terminal 604 is changed to READY, and the mangeto-optical disk device control unit 113 reads the sector address 603 that was detected.

Figure 6:
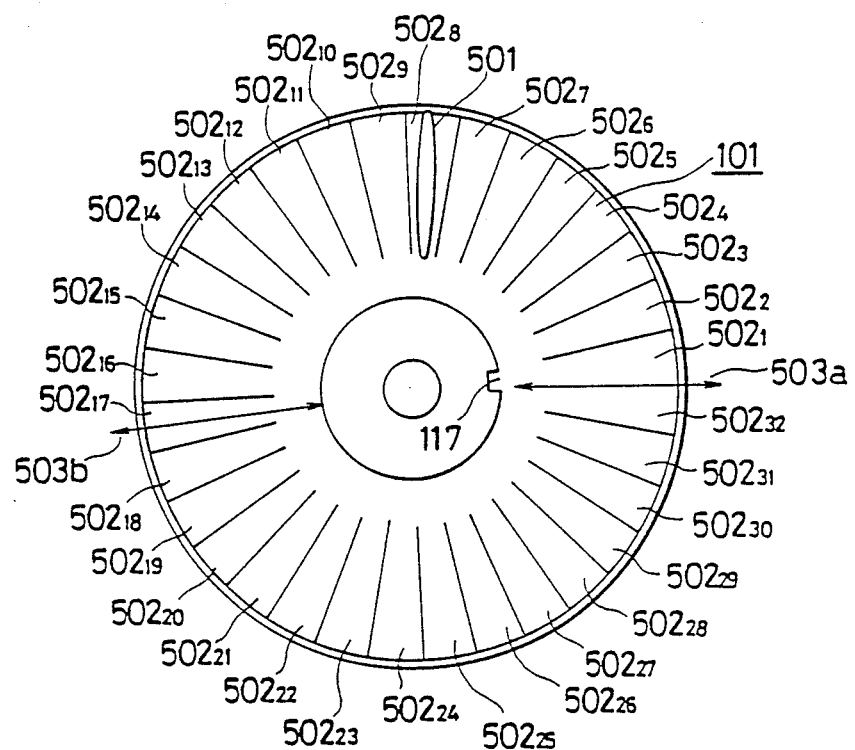
FIG. 6 is a diagram for illustrating the configuration of the sector on the recording medium having an even number of regions.
Figure 7:
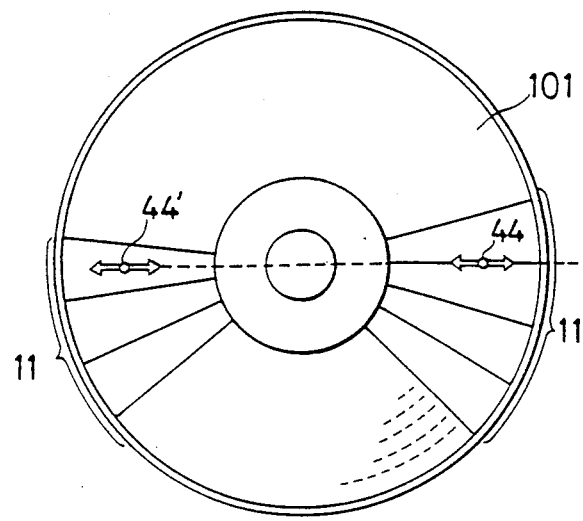
FIG. 7 is a diagram for illustrating the relative positions of two magneto-optic heads in a sector that is divided into an odd num of regions.

FIG. 6 is a diagram for showing the first system that performs the erasure operation at the time of recording information prior to the recording operation, the second system that records information in the erased regions, and the relative positions of the sectors on the magneto-optical disk. Here, what is meant by the erasure operation or the recording operation is a series of operations for carrying out erasure or recording of information, by confirming the addresses of the indicated sectors through reproduction of the sector addresses and by detecting further the respective predetermined positions.

The magneto-optical disk 101 is driven by the rotary motor 102 to be rotated in the clockwise direction so as to be given a predetermined angular velocity. The recording region 501 on the magneto-optical disk 101 has essentially been partitioned by radii with the rotation synchronization mark 117 as reference. The mark 117 may protrude as shown in the figure. The sectors $502_1$ to $502_{32}$ have a sector composition which is the same as shown in FIG. 2, and the sector addresses are assigned to respective sectors from $502_1$ to $502_{32}$ and from the inner periphery to the outer periphery one after another.

The arrow designated as 503*a* is the first system for performing the erasure operation of information, and indicates the direction of motion of the light spot on the recording film that is controlled by the optical head (1) 108*a* when it is to be accessed in the radial direction of the magneto-optical disk 101. Further, the arrow designated as 503*b* is the second system for performing the recording operation of information, and indicates the direction of motion of the light spot on the recording film that is controlled by the optical head (2) 108*b*.

Here, the relative position of the two optical heads 108*a* and 108*b* is such that when the first optical head (1) 108*a* for erasure is, for example, at the head of a sector accessed, the other optical head (2) 108*b* for recording is situated at about the middle of the sector.

In other sords, when the optical heads are arranged in this manner, when one of the optical heads is reproducing the sector address, namely, when the sector address control unit 114 of FIG. 1 is in execution, the other optical head has already completed reproduction of the sector address and is performing the erasure operation or recording operation of information by actuating the recording mode control unit 115. In this way, the timing for the sector address reproducing and detection of the sector and the ensuing execution of the erasing and reproducing operations of recorded information is staggered between the two optical heads.

With this arrangement, prior to the recording of information bits at the time of executing the recording mode, the recording regions are erased regardless of whether or not the regions are recorded previously. Therefore, not only double writing of information and unwitting leaving of information, without erasure, in the recording regions can be avoided, but also it can be made unnecessary to check, on the system side, whether or not information is already recorded in the recording regions or whether or not the information is already erased. Therefore, it is made possible to provide a device which has an easy system control and is convenient to use. Further, by providing two sets of optical heads, it becomes possible to reduce the time required for the execution of recording to about one half. Moreover, by staggering the timing of the sector address detection of the two optical heads, it becomes possible to reproduce and detect the sector addresses of the two optical heads with the same sector address control unit. In addition, control of the two optical heads can be carried out easily using one control system instead of two control systems that would be required for the respective optical heads.

In the above embodiment, use was made essentially of a magneto-optical disk which is divided radially into an even number of equal sectors. However, it should be obvious that similar effects can be obtained, even if the magneto-optical disk is divided into an odd number of sectors per rotation, provided that the radial directions of motion of the first and the second systems are arranged at the opposite positions, in compliance with the ideas of the present invention.

Figure 8A:
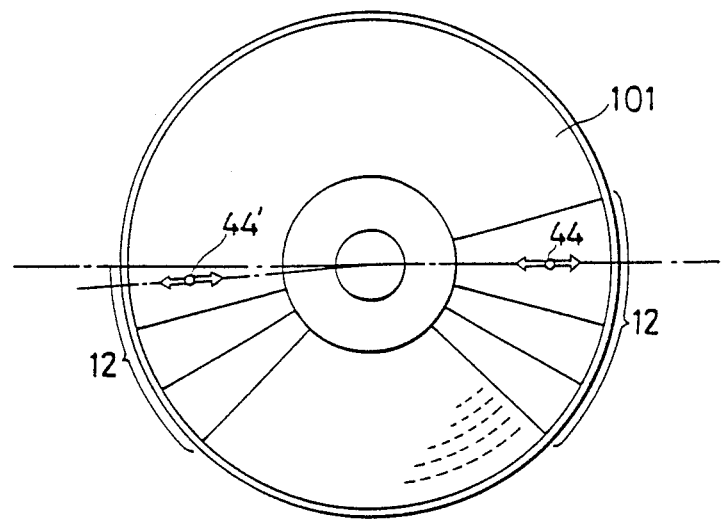
FIGS. 8(a) and 8(b) are a diagrams for illustrating the arrangement of magneto-optic heads that are suited for both of division in an odd and an even number of regions.
Figure 8B:
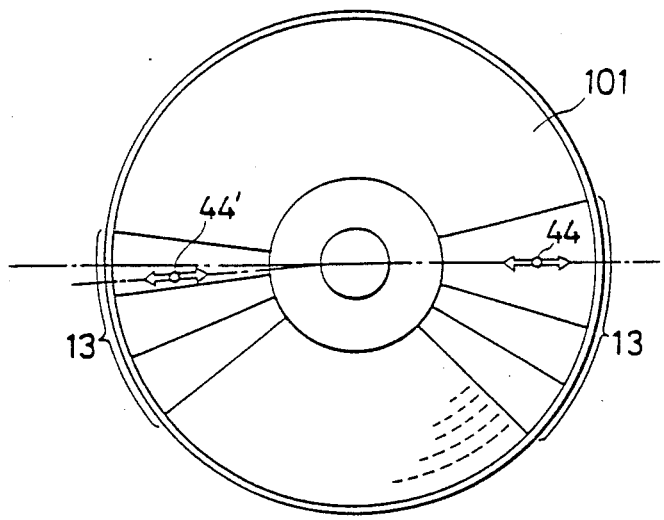

Moreover, it is possible to set the moving positions of the magneto-optical heads so as to be usable for either case of division into an even and division into an odd number of sectors. FIGS. 8(*a*) and 8(*b*) are the diagrams for illustrating the sectors 12 and 13 and the relative position of the magneto-optical heads 44' and 44 for the cases when the magneto-optical disk 101 is divided equally into an even and odd numbers of sectors, respectively. The positional relationship of the magneto-optical heads 44' and 44 is arranged to be the same for both of FIGS. 8 (A) and 8 (B).

This can be realized by arranging the magneto-optical head 44 for recording by about a quarter of a sector width removed from the position opposite to the magneto-optical head 44' for erasing. In fact, in the schematic block diagram shown in FIG. 2, the region 203 where information concerning the sector address is buried corresponds to about 200 bits while the recording region 207 for information signal correspond to about 4,000 bits. Therefore, the effects mentioned in connection with the embodiment of the invention can be realized positively by a shift of one quarter of the sector width Further, because of the compatibility of a magneto-optical disk 101 that is divided into an even number of equal sectors and a magneto-optical disk 101 that is divided into an odd number of equal sectors, the device can accommodate all kinds of magneto-optical disks, in addition to the realization of the effects mentioned earlier.

Moreover, the invention is by no means limited to the above embodiment. Thus, for example, the optical heads and the elements for generating magnetic field may be arranged on the same side of the magneto-optical disk.

In the foregoing, description has been given mainly about the detection of the sector address In what follows, a detailed description will be given about a recording method which makes an effective application of two optical systems. Namely, it is a method to examine, prior to the recording on the magneto-optical disk 101, the state of the recording surface of the disk 101, and to vary the recording device depending upon whether or not the surface is in a condition suitable for the device.

As an option, there may be added anew a defect detection circuit 130 as indicated in the block diagram in FIG. 1.

During the execution of the recording mode, signal from the optical head control unit (1) 109a is divided into two parts, and one part is input to the sector address control unit 115 as described in the above, while the other is input to the defect detection circuit 130. In the defect detection circuit 130, all of the defects such as dust, scratches, and pinholes that may exist on the magneto-optical disk 101 that will cause errors in the signals are detected to judge whether or not they are above a predetermined standard. The operation of executing the recording mode in accordance with this method, for recording information that is transferred from the external system, will now be described briefly.

When a recording mode indication signal, information bits to be recorded, and information on recording sector are transferred from the external system, the magneto-optical disk device control unit 113 carries out reproducing and detection of the section address in the section address control unit 114, and the optical head (1) 108a and the optical head (2) 108b are given access to the track on which is located the indicated sector by the feed motor control unit (1) 110a and the feed motor control unit (2) 110b. Then, the directions of the magnetic domains there are arranged uniformly in a fixed direction under the erasure operation through a continuous irradiation, of the information bit recording regions of the indicated sectors, regardless of whether there exists information. Irradation is performed using laser light of a predetermined intensity, by the optical head (1) 108a of the first system which includes the permanent magnet (1) 107a whose polarity is determined in accordance with the recording mode control unit 115, so as to generate a magnetic field with erasure direction. At the same time, defects beyond a predetermined standard that exist in the region are detected in the defect detection circuit 130 and transferred to the magneto-optical disk device control unit 113. This will be described in detail later.

Next, the sector whose information is erased by means of the optical head (1) 108a of the first system, is rotated by the rotary motor 102 and is brought to the position of the optical head (2) 108b of the second system that includes the permanent magnet (2) 107b with a polarity that is determined to generate a magnetic field in the direction for recording information. If the defects that exist in each region are below a fixed standard, information transferred from the external system is recorded in turn, in accordance with the recording mode control unit 115, in the region where the magnetic domains are arranged in a fixed direction by the erasure operation, through turning on/off of the laser light from the optical head (2) 108b.

Next, the method of detecting defects will be described by referring to FIG. 9.

FIG. 9 is an embodiment for illustrating the operation of the defect detection circuit 130. In this embodiment, defects are detected by detecting changes in the reflected light from the magneto-optical disk 101 by using optical head (1) 108a of the first system that carries out the erasure operation for the information recorded previously.

During the erasure operation, a continuous laser light with a predetermined intensity is irradiated on the magneto-optical disk 101. If there ixist defects such as pinholes, dusts, and scratches, the amount of reflected light is reduced. The defects are detected in a comparator 701 by comparing the reflected light with a predetermined level X of reflected light.

If the output level of the magneto-optical disk 101 is above the level X, the output of the comparator 701 becomes High (H) level. Then, the inverter circuit 702 is inverted and the output of a counter 704 is cleared so that it can be determined from this signal that there did not exist a defect. Next, if there exists a defect and the output of the reflected light becomes lower than the level X, the output of the comparator 701 becomes Low (L) level, the output of the inverter circuit 702 becomes H level which becomes an input to an AND circuit 703. In the AND circuit 703, the output from the inverter circuit 702 and the clock undergo an AND operation, and outputs a clock signal for the counter 704 where there is obtained a counted value that corresponds to the length of the defect. The counted value is then sent to a conditional comparison unit 705.

The counted value of a defect thus detected and a predetermined value which is set beforehand in a conditional setting unit 706 are compared in the conditional comparison unit 705 to perform an effective detection of defect with length that is larger than a predetermined value. The result is sent to the magneto-optical disk device control unit 113. In addition, the defect information is recorded as needed in a predetermined region of the magneto-optical disk 101 as an information for managing formatting to be used for processing and managing the information for each sector Further, by designating the defects detected by the defect detection circuit 130 to be defects that are beyond the error correction ability of the system, for instance, by designating them as large burst-like defects, it becomes possible to construct a detection circuit in an economical manner.

In this manner, by the provision of two systems, information recording at high speed becomes possible In addition, in the execution of the information recording, detection of defects without fail can be arranged prior to the recording of information, so that it becomes possible to provide a device that has low error rates and high reliability.

The defect detection can also be performed at the time of formatting instead of at the time of recording information, as was done in the above. The detection method in the former case will now be described in the following.

First, prior to the recording of information, a magneto-optical disk 101 which is magnetized uniformly in a fixed direction in advance (a recording medium for which recording is to be made for the first time) is mounted as shown in FIG. 1. Then, the magneto-optical heads 108a and 108b are moved to the position of the inner most circumference that is determined by the system (or the specifications). By driving the magneto-optical head 108b successively in the direction toward the outer circumference, sectors as shown in FIG. 2 are formed In constructing a sector, formatting signals consisting of a synchronized signal (1) 201, a header (1) 202, a sector address number 203, a synchronized signal (2) 205, a header (2) 206, and in information signal 207 are written successively. Ordinarily, about 200 bits are provided for the region (201 to 203) where signals relating to the sector address are written, and about 4,000 bits are provided for the region (204 to 207) for recording information signals. In the region for sector address number 203, the address number is written by counting up (or counting down) for every sector or for every rotation of the disk.

Next, when the sector which is formatted by the magneto-optical head 108b is brought to the position of the magneto-optical head 108a, by the rotation of the rotary motor 102, the formatting signals that were recorded previously under the control of the formating control unit 120 are reproduced (inspected). In the process of reproducing, exact detection of the header (2) 206 is inspected provided that the sector address number 203 is detected exactly. Furthermore, detection is made of defects (scratches and the like) in the region 207 for the information signals, that are beyond a predetermined standard that are tolerated by the system. The result of the detection is recorded by the magneto-optical disk device control unit 113 in, for example, a predetermined region of the magneto-optical disk 101 as an information for managing the formatting in order to process and manage the information for each sector.

In this manner, the magneto-optical disk 101 is formatted with respect to the sector control signals, prior to the recording of information. In addition, defects that are generated in the sector control signals at the time of formatting, defects that existed in the information signal region of the magneto-optical disk 101, and the like are also detected and managed. Therefore, the result obtained has an extremely high reliability.

According to the present embodiment, use was made of two systems in recording information. However, even in the case of adopting the method of using just one system, and erasing the recorded region in the first rotation and then recording information in the next rotation, it is similarly possible to detect defects during erasing. In this way, it becomes possible to provide a device that has high reliability with fewer system errors.

In the above structure, reproduced signals are arranged to be sent directly to the reproducing mode control unit 116 from the optical head control units 109a and 109b. It may be arranged, however, to be sent via the sector address control unit 114 (dotted line in FIG. 1). This case will be described by referring to FIG. 10.

A first reproduced signal from an optical head reproduced signal outputting terminal 609 of the optical head control unit (1) 109a and a second reproduced signal from an optical head reproduced signal outputting terminal 610 of the optical head control unit (2) 109b, of a signal that is recorded on the magneto-optical disk 101, are input to an input signal selector 608 of the sector address control unit 114. One of these two reproduced signals is selected here in accordance with the signal from an optical head switching signal outputting terminal 601 of the magneto-optical disk device control unit 113 to reproduce and detect the sector address. Namely, when the signal from a sector address detection command outputting terminal 602 from the magneto-optical disk device control unit 113 is input to the sector address control unit 114, the signal to a sector address detection status inputting terminal 604 becomes BUSY, and is selected by an input signal selector 608 that is indicated by the signal from the optical head switching signal outputting terminal 601. One of the reproduced signals that is selected is led to a phase synchronization circuit 607 to detect the starting position of the sector address signal of a header detection circuit 606, and reproduces and detects the sector address in an address detection circuit 605. Upon reproducing and detection of the sector address, the signal to the sector address detection status inputting terminal 604 is changed to READY, and the magneto-optical disk device control unit 113 reads the sector address that is detected. The other of the reproduced signals is sent out as an input signal to the reproducing mode control unit 116.

Figure 11:
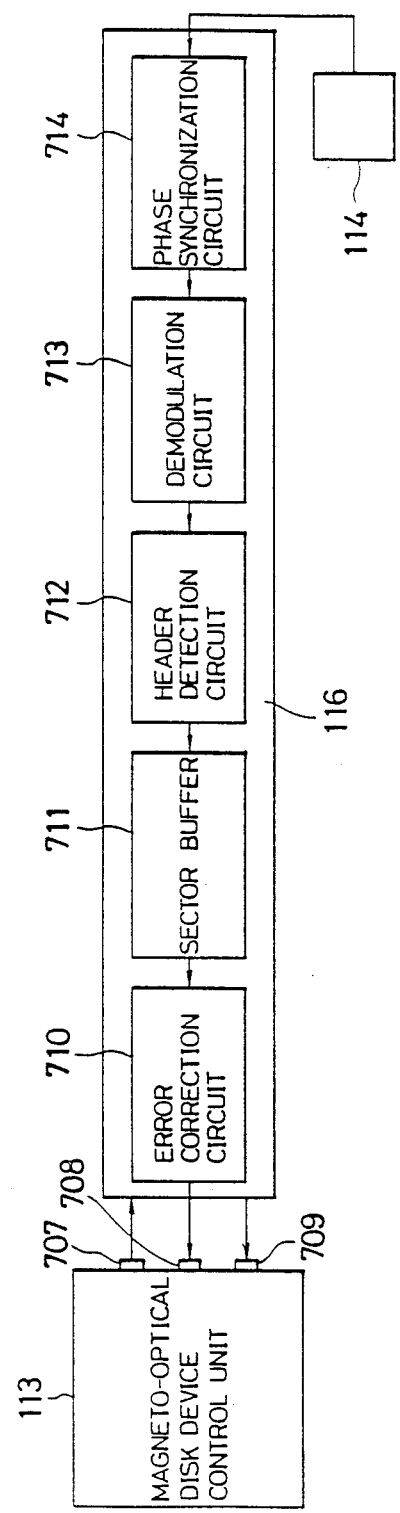
FIG. 11 is a block diagram for illustrating an embodiment of the reproducing mode control unit.

FIG. 11 is a diagram for illustrating the details of the operation of the reproducing mode control unit 116. The signal to a signal reproducing status inputting terminal 709 from the reproducing mode control unit 116 is turned to BUSY by the signal from a signal reproducing command outputting terminal 707 of the magneto-optical disk device control unit 113, and the reproduced signal from the sector address control unit 114 that is indicated by the signal from the optical head switching signal outputting terminal 601 and selected by the input signal selector 608, led to a phase synchronization circuit 714, demodulated in a demodulation circuit 713, detects the beginning position of the information signal by the header detection circuit 712, and is transferred to a sector buffer 711. The signal transferred to the sector buffer 711 undergoes next an error correction processing in an error correction circuit 710. The reproduced signal is then transferred to a reproducing information signal inputting terminal 708 of the magneto-optical disk device control unit 113. When the reproducing processing for a sector is completed, the signal to the signal reproducing status inputting terminal 709 is changed to READY.

Figure 12:
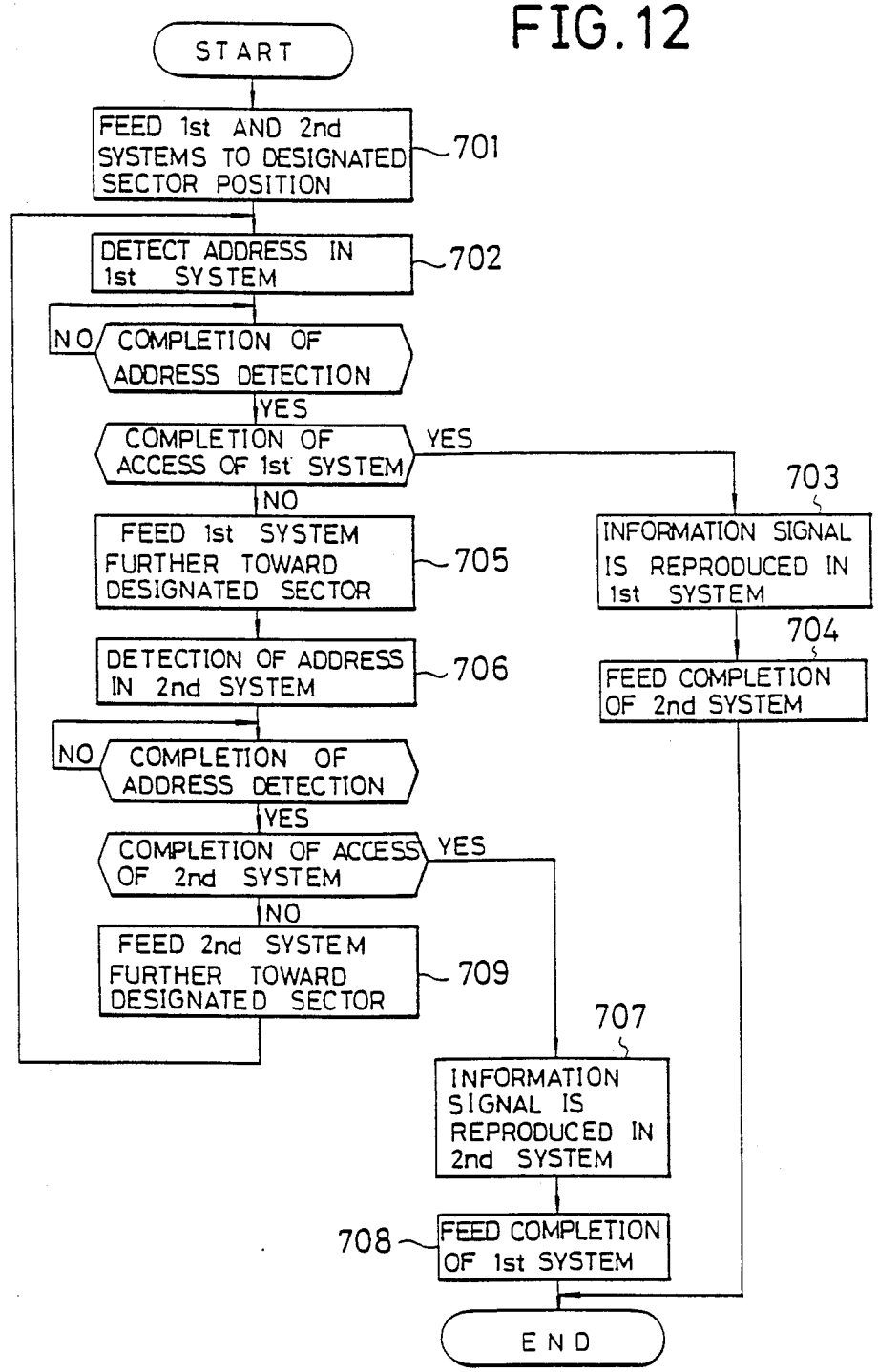
FIG. 12 is a flow chart for another embodiment of the invention.

FIG. 12 is a simplified diagram for showing the flow of operation of the first and the second systems in executing the reproducing mode. When the reproducing mode indication signal, information on the reproducing sector, and the like are transferred from the external system, the magneto-optical disk device control unit 113 lets the first and the second systems move to the positions of the indicated sector (701). Next, upon completion of the moving of the first system, the optical head reproducing signal is selected in the input signal selector 608, and the sector address is detected by the sector address control unit (702). When the sector address of the first system that is detected is the indicated sector address, the information signal is continued to be reproduced in the first system without change (703), and at the same time, the movement of the second system is completed (704). On the other hand, if the sector address detected differs from the indicated sector address, the first system is moved again in response to the amount of difference (705). Then, after confirming the completion of the motion of the second system, the optical head reproducing signals is selected in the input signal selector 608, and the sector address is detected in the sector address control unit 114 (706). When the sector address of the second system that is detected is the indicated sector address, reproducing of the information signal in the second system is carried out without interruption (707). At the same time, motion of the first system is completed (708). On the other hand, if the sector address detected is different from the indicated sector address, the second system is moved again in response to the deviation (709), and then it returns to the operation (702) described above.

Moreover, although the magneto-optical disk in the above was divided radially by a spiral into equal sectors, the division may also be done concentricly.

Furthermore, the magnetic field generating element in the present embodiment was constructed using permanent magnets, it may also be formed by the use of electromagnets. An example of such an element will be described in what follows.

Figure 13:
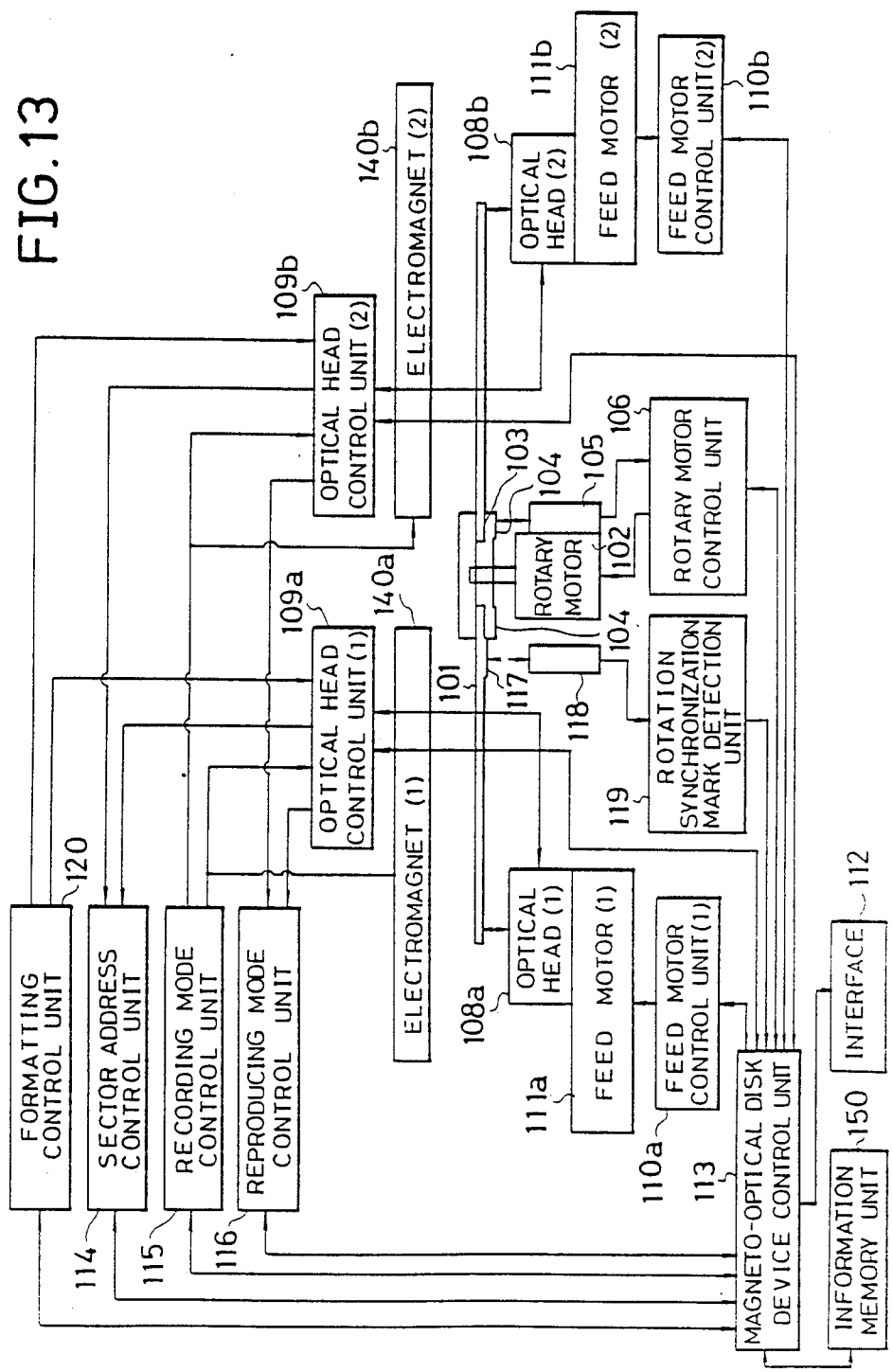
FIG. 13 is a schematic block diagram for another embodiment of the invention.

FIG. 13 is a diagram for illustrating a simplified structure of an optical information recording and reproducing device that uses a magneto-optical disk as the recording medium, for another embodiment of the invention.

The magneto-optical disk 101 is mounted on the turn table 103 above the rotary motor 102. On the turn table 103 there are patterned rotation controlling patterns 104 that have a predetermined separation radially The rotation controlling patterns 104 are detected by the light detector for rotation control 105, and the rotary motor 102 is driven and rotated by the rotary motor control unit 106 to give it a predetermined speed.

Reference numerals 140a and 140b are magnetic field generating elements consisting respectively of electromagnets with mutually opposite polarities that can be inverted. These electromagnets have a sufficient radial length with respect to the information recording and erasing region of the magneto-optical disk 101, and generate magnetic field which is uniform and sufficient for recording and erasing Reference numerals 108a and 108b are the optical heads (1) 108a and (2) 108b that are controlled by the optical head control units 109a and 109b, respectively, where each head consists of a laser, photo-detectors, an optical element, and others, for irradiating the magneto-optical disk 101 with laser beam and for detecting tracking and focusing control signals and the information recording signal.

The optical heads (1) 108a and (2) 108b are held respectively by the feed motors (1) 111a and (2) 111b that are connected to the feed motor control units (1) 110a and (2) 110b and these optical heads can be moved to an arbitrary radial position of the magneto-optical disk 101. Further, a first system is formed by the electromagnet (1) 140a, the optical head (1) 108a, and the feed motor (1) 111a, and a second system is formed by the electromagnet (2) 140b, the optical head (2) 108b, and the feed motor (2) 111b.

FIG. 14 is a simplified diagram for illustrating the flow of operation of the first and the second systems in the execution of the recording mode of the present invention, for the recording information that is transferred from the external system.

When the recording mode indication signal, and information on the recording sector are transferred from the external system, the magneto-optical device control unit 113 causes the first and the second systems to move to a designated sector (sector A) position (801). Here, A represents the number of sectors that is determined by the system that corresponds to the time necessary for reversing the direction of the magnetic field. Next, when the feeding of the first system is completed, the optical head reproducing signal is selected by the input signal selector 608, and the sector address is detected by the sector address control unit 114 (802). If the sector address of the first system that is selected is the predetermined sector address, the polarity of the electromagnet 140a is set to the erasing direction and the polarity of the electromagnet 140b is set to the recording direction (803) to carry out the recording mode (804).

Namely, the first system is given access to the designated sector position, and the directions of the magnetic domains of the information bit recording regions of each of the designated sectors are successively arranged to be uniform in a fixed direction by means of the erasure operation in which laser light with a predetermined intensity is irradiated continuously regardless of whether or not there exists prerecorded information.

On the other hand, if the sector address that is detected by the first system differs from the predetermined sector address, the first system is further fed in response to the deviation (805). After confirming the completion of the motion of the second system, the optical head reproducing signal is selected by the input signal selector 608, and the sector address is detected by the sector address control unit 114 (806). If the sector address of the second system that is detected is the predetermined sector address, the polarities of the electromagnets 140a and 140b are set to the recording and erasing directions, respectively, (807), to carry out the recording mode in accordance with the procedure similar to the one described in the foregoing.

Further, if the detected sector address differs from the predetermined sector address, the second system is further fed in response to the deviation (809), and returns to the operation of (802) described in the above. As in the foregoing, both of the first and the second systems are driven toward the designated sector, and the erasure operation of information is carried out using the system that is given access to the designated sector first, and the recording operation of the information is carried out with the other system. With this arrangement, the time in waiting for rotation can be reduced to about one half, realizing access at high speed.

Moreover, in the present embodiment, use was made of a fixed electromagnet with sufficient length in the radial direction as the external magnetic field generating element. However, it may be replaced by an electromagnet that can generate a magnetic field which is sufficient to record/erase the signal, and is movable integrally with the feed motor. Also, a permanent magnet may be used as a magnetic field generating element in which the polarity of the magnet may be switched mechanically for recording and erasure.

Furthermore, the above embodiment may not be considered to be completely ready to handle continuously flowing signals such as music that are brought in successively. As a means of dealing with such a case, there may be provided an information memory unit 150, as shown in FIG. 13, for temporarily recording information signals that are input from the external system to the magneto-optical disk device control unit 113 via the interface 112. The information that is input to the information memory unit 150 is read piece by piece as soon as it becomes ready for recording, and is sent to the recording mode control unit 115. Or else, use may be made of a device in which unnecessary information is erased in the first optical system, and storing of information is carried out for the duration of time for the erased region to be recorded by the second optical system after rotation of the rotary motor 102.

Moreover, various modifications will become possible without deviating from the scope of the present invention. Thus, for instance, by temporarily storing information in memory that corresponds to the waiting time for rotation, it becomes possible to store information that is input continuously from the system side, from the beginning to the end, in almost real time without missing any portion.

What is claimed is:

1. A reproducing system which reproduces information that is recorded on a magneto-optical disk comprising:
   a magneto-optical disk in which are formed a plurality of sectors along tracks in said magneto-optical disk;
   a turntable for supporting and rotating said magneto-optical disk;
   two optical heads for reading and writing information in said sectors; and
   control means for controlling said two optical heads.

2. The magneto-optical disk reproducing system of claim 1 wherein said two optical heads are arranged so that when one optical head is reading, another head is writing.

3. A formatting system for recording a track format on an optical disk comprising:
   a turntable for supporting and rotating an optical disk to be formatted;
   a first optical head for writing of formatted information in order to form a plurality of sectors along a track of said disk;
   a second optical head for reading of said formatted information written by said first optical head in order to detect defects occurring in said sectors; and
   a control means for controlling said turntable and said first and second optical heads to perform said reading and said writing of said formatted information, and to write on said optical disk information indicative of said defects detected during said reading of said formatted information.

4. A formatting method of recording a track format on an optical disk comprising the steps of:
   writing formatted information in order to form a plurality of sectors along a track of said disk;
   reading said formatted information in order to detect defects occurring in said sectors; and
   writing on said optical disk information indicative of said defects detected in said reading step.

5. The formatting system of claim 3, wherein said control means controls said first and second optical heads so that when said first optical head is writing, said second optical head is reading.

* * * * *